A. C. Fry,

Feed Regulator.

No. 98,412.  Patented Dec. 28. 1869.

Witnesses.
Edmund Masson.
Frank A. Jackson.

Inventor
Aaron C. Fry

United States Patent Office.

AARON C. PRY, OF KEEDYSVILLE, MARYLAND.

Letters Patent No. 98,412, dated December 28, 1869.

IMPROVEMENT IN HOPPER-BOY RAKE.

The Schedule referred to in these Letters Patent and making part of the same.

To all whom it may concern:

Be it known that I, AARON C. PRY, of the town of Keedysville, county of Washington, and State of Maryland, have invented a new and useful Hopper-Boy Rake.

My invention consists in the novel construction of the hopper-boy shaft, and in the mode of attaching the rake thereto, by means of which the rake will act upon the surface of the material being fed through the hopper, and thus effect a regular feed, and at the same time be always free from any liability to clog or strain; and I do hereby declare that the following specification, taken in connection with the drawings furnished, and forming a part of the same, is a true, clear, and exact description thereof.

Figure 1:
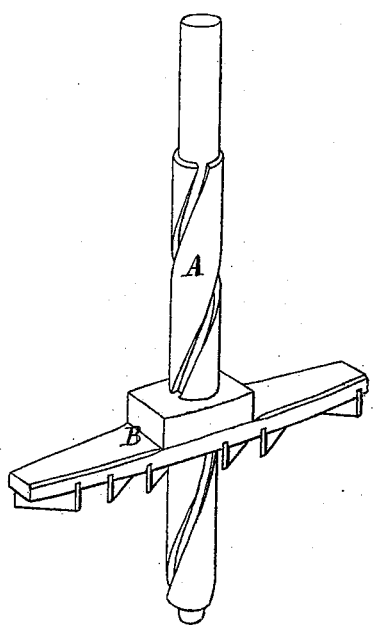

Figure 1 represents the shaft and rake in perspective.

A is the shaft. It is provided with a longitudinal spiral groove.

B is the rake proper, and is loosely fitted to the shaft, and is provided with a spline or splines, adjusted to the spiral groove, in the shaft A.

Figure 2:
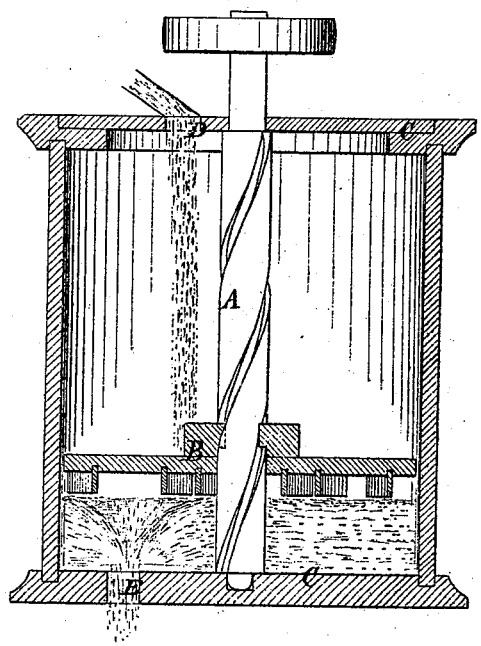

Figure 2 represents the mode of application and operation of my invention.

C represents a tank or hopper.

D is the inlet for the chop or meal, as it comes from the mill.

E is the outlet to the "bolts."

In the centre of this tank or hopper is the upright shaft A, and attached thereto, as before described, is the rake B. Should the draught from the tank be cut off, for any reason, and the chop or meal accumulate, the rake B would, by reason of the spiral groove, constantly remain upon the surface. While the outlet is open, the discharge is regularly maintained.

Heretofore hopper-boy rakes have been generally constructed with a straight shaft, to which was loosely fitted the rake. Near the top of the tank, passing through a mortise in the shaft, was a cross-bar, the ends of which were secured to the corresponding ends of the rake, by means of a cord or rope. The rake was balanced by a weight attached to a cord which passed over a pulley in the shaft, near the cross-bar before described, thence downward and fastened to the rake. When the meal accumulated in the tank, if the parts were working well, the rake would rise and fall, but if, from any cause, the rake should fail to rise, and become covered to any consideral depth, it would clog, and either badly strain or break the machinery.

Having thus described my invention,

I claim as new, and desire to secure by Letters Patent—

The shaft A, provided with a spiral longitudinal groove, in combination with the rake B, provided with a suitable spline or splines, substantially as shown and described.

AARON C. PRY.

Witnesses:
 W. C. WOOD,
 PHIL. F. LARNER.